United States Patent [19]

Duncan et al.

[11] Patent Number: 4,791,529
[45] Date of Patent: Dec. 13, 1988

[54] PROTECTED POTTED METALLIZED FILM CAPACITOR

[75] Inventors: George I. Duncan, Glenview; Stephen L. Phelps, Chicago, both of Ill.

[73] Assignee: Advance Transformer Company, New York, N.Y.

[21] Appl. No.: 45,923

[22] Filed: May 1, 1987

Related U.S. Application Data

[63] Continuation-in-part of Ser. No. 943,478, Dec. 16, 1986, Pat. No. 4,714,979.

[51] Int. Cl.[4] .......................... H01G 1/08; H01G 1/11
[52] U.S. Cl. ...................................... 361/274; 361/275
[58] Field of Search ................ 361/274, 275, 433, 272

[56] References Cited

U.S. PATENT DOCUMENTS

| | | | |
|---|---|---|---|
| 3,244,952 | 4/1966 | Graf | 361/275 |
| 4,150,419 | 4/1979 | Epple et al. | 361/275 |
| 4,186,417 | 1/1980 | Grahame | 361/275 X |
| 4,633,365 | 12/1986 | Stockman | 361/275 X |
| 4,635,163 | 1/1987 | Voglaire | 361/275 |

FOREIGN PATENT DOCUMENTS

| | | |
|---|---|---|
| 168370 | 1/1986 | European Pat. Off. . |
| 2589618 | 5/1987 | France . |
| 1388052 | 3/1972 | United Kingdom . |

Primary Examiner—Donald A. Griffin
Attorney, Agent, or Firm—Thomas A. Briody; Jack E. Haken; Leroy Eason

[57] ABSTRACT

A protective system to prevent a dry metallized film capacitor from rupturing its case or catching fire in the event that an internal short or fault occurs within the capacitor section utilizes a fuse and a thermal protector connected in series with the capacitor section and within its case. The fuse serves to protect the unit from a fault-induced low resistance high current in-rush, while the thermal protector is triggered by a fault-induced high resistance low current. A heat reflective circumferential sheet and the positioning of thermal protector maximize its value in the protective system.

13 Claims, 2 Drawing Sheets

PROTECTED POTTED METALLIZED FILM CAPACITOR

This application is a continuation-in-part of Ser. No. 943,478 filed Dec. 16, 1986 and now U.S. Pat. No. 4,714,979 issued Dec. 22, 1987.

BACKGROUND OF THE INVENTION

1. Field of the Invention

The invention pertains to the field of dry metallized film capacitors and in particular dry metallized polypropylene capacitors for use, for example, in high intensity discharge ballasts, said capacitors having a protective system to prevent the capacitor from rupturing or catching fire under short-circuit conditions. The protective system uses both thermal and electrical fault interruptors.

2. Description of the Prior Art

There is little known prior art either in the printed literature or in the patent literature in the field of dry metallized film capacitors having internal fault interruptors. What is known about the prior art is that internal fault interruptors have generally been either of thermal or pressure sensitive types. A capacitor protected solely by a thermal fault interruptor will be protected only in the event of a low current leakage, in which, with time the internal heat will rise sufficiently to trigger the fault interruptor. In the situation in which the thermal interruptor is used with an AC capacitor in a plastic case, an unacceptable leakage current situation may develop which, prior to the activation of the fault interruptor, can cause the plastic of the case to melt or rupture. An unacceptable leakage current occurs in particular under conditions in which a hot spot is present and the plastic of the case becomes contaminated with metal from the metallized surface of the capacitor film roll. In the event of a direct electrical short, not cleared by the metallized film, very large currents may flow, causing rapid gas expansion or localized heating away from a thermal interruptor, unless interrupted by an electrical fuse before excessive internal or external damage can occur.

The prior patent art on metallized film capacitors with fault interruptors includes British patent No. 1,569,186 which discloses a film capacitor in which the capacitor roll deforms when heated, breaking a contact. The problem with this device is that by the time the internal temperature is high enough to deform the film roll, some other interruption may have occurred, such as a rupturing of the case or a melt down of the plastic case.

U.S. Pat. No. 3,496,432 also pertains to a dry film capacitor relying on temperature to break a contact.

U.S. Pat. No. 3,909,683 teaches a pressure sensitive fault interruptor in a dry film capacitor. It provides a yielding cavity with a fusible portion of one lead wire passing therethrough. In the event of overpressure caused by a fault, at least one contact bridge is separated. Unfortunately, gases accumulate in the cavity and can be ignited by a spark from the breaking of the contact. The device tends to be too unreliable for commercial use.

Until very recently, as a result of changes in UL requirements, no dry film capacitors with fault interruptors have been commercially available, indicating that the few devices disclosed in the prior patent literature have little or no commercial value, despite proposed UL requirements which have been published in capacitor-UL-810.

The literature on wet film capacitors with fault interruptors is extensive; typical recent U.S. patents are U.S. Pat. Nos. 4,398,782 and 4,454,561.

The prior art either in the literature or in commercially available products does not disclose an internal fault interruptor for dry metallized film capacitors which can operate over a wide range of current wherein the interruptor includes both thermal and current sensitive protective devices.

SUMMARY OF THE INVENTION

This invention pertains to metallized film capacitors for use with high intensity discharge ballasts, motor run capacitors, and the like, wherein such capacitors must operate over a wide range of current and must include fault interruptors. The purpose of a fault interruptor in a metallized film capacitor is to electrically isolate the capacitor from a power source when the capacitor has developed a complete or a partial short within the windings of the capacitor itself. The invention provides a protected metallized film capacitor in which the protection is realized by utilizing a combination of a current activated fuse and a heat actuated thermal protector, both of which are connected in series with the capacitor. The wound capacitor roll may be wrapped in aluminum foil to divert heat generated by a fault inward to the hollow core of the capacitor section, as well as to contain any molten material. The thermal protector is electrically incorporated in one lead and situated within the core of the capacitor film roll to increase its sensitivity to temperature changes. A current activated fuse is also electrically connected to one lead, such that the capacitor, the thermal protector and the fuse are connected in series. The protection from this combination is very effective because it covers the spectrum of possible failure modes in dry metallized film capacitors. In the event that the in rush of current is very high, which could cause the capacitor case to rupture violently, the fuse serves as a protective device against such a failure. On the other hand, if the in-rush of current is low enough so that it would not take out a fuse, the low current will cause the capacitor to heat up to a point at which the thermal protector would be activated to prevent a fire or melting of a plastic housing.

DESCRIPTION OF THE PREFERRED EMBODIMENT

Figure 1:
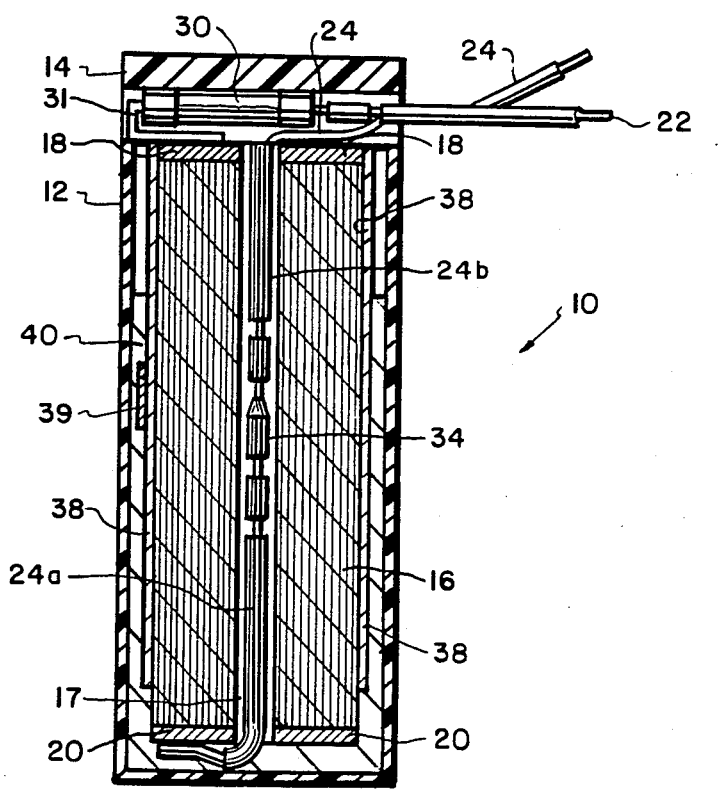
FIG. 1 is a cross sectional view of a dry metallized film capacitor with the fault interruptor of the present invention in place.

FIG. 1 illustrates a dry metallized film capacitor 10, having a typical construction but incorporating therein the protective fault interruptor of the present invention. Such capacitors may be used as motor start or motor run capacitors or with high intensity discharge ballasts. Capacitor 10 has a plastic case 12, a plastic cover 14 and contains a metallized film capacitor section or roll 16 of metallized polypropylene with a hollow core 17. Capacitor section 16 has metallic contact points or terminals 18, 20 to which typically lead wires 22, 24 are electrically and mechanically secured. As explained below, in the preferred embodiment each lead is connected differently to incorporate the fault interruptor of the present invention which provides a protected film capacitor.

In the preferred embodiment, case 12 and cover 14 may be made of any non-conductive materials which meet the performance standards for such a capacitor. Typically, GE Noryl (TM) or a polyphenylene-based resin are used. The capacitor section 16 is usually a roll of metallized polypropylene, two sheets being wound together on a roll, one sheet for each plate, the film for each plate being extended at one side of the roll so that each end of the capacitor section may be shooped to form metallic contact points 18, 20 for an electrical connection to one plate at each end. The capacitor section 16 is usually wound on an arbor and when removed therefrom has a hollow core 17.

Figure 3:
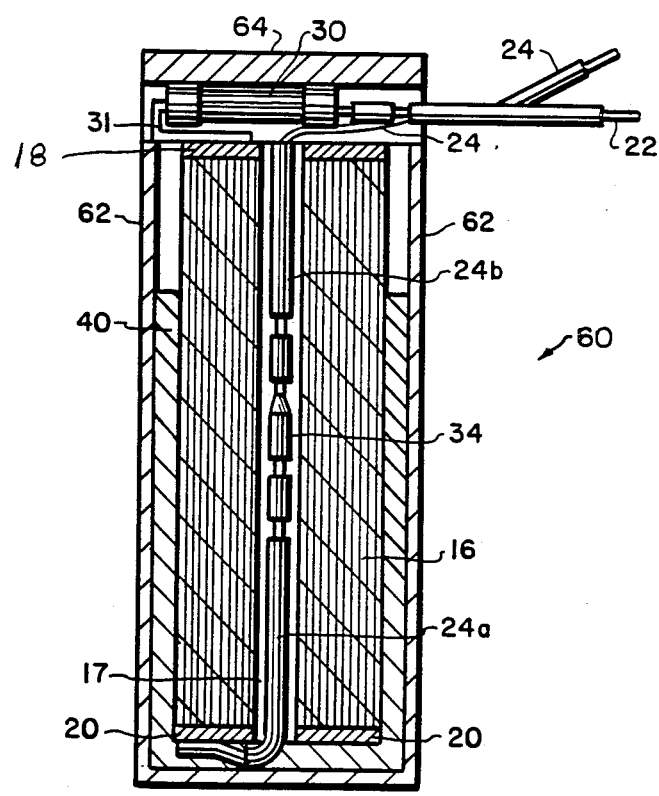
FIG. 3 is a cross sectional view of an alternate embodiment of the present invention.

In an alternate embodiment illustrated in FIG. 3, case 62 and cover 64 are metallic.

FIG. 1 also shows the preferred embodiment of the protective fault interruptor of the present invention in an operational condition as installed in the typical AC capacitor 10. The purpose of the fault interruptor is to isolate the dry metallized film capacitor from a power source when the capacitor has developed a complete or a partial short within the windings of the capacitor itself. During such a fault, between the terminals 18, 20 of the capacitor 10, internal to the capacitor section 16, a rise in pressure and/or temperature occurs within the capacitor roll as a result of the breakdown of the dielectric, first producing a slowly rising temperature in the case of a low current flow or various gases in the case of a higher current flow. In a low temperature mode, in a low amperage operational environment, the temperature inside the case 12 will tend to rise slowly, eventually developing a hot spot in the side wall of the case and rupturing the plastic case by a melting thereof. In the case of a high current flow through the capacitor, gases will be produced from the dielectric and the expansion of the gases could cause a rupture of the rigid case. Gases are usually able to exit the capacitor at one end or the other thereof since they tend to concentrate in the core or at the top of the capacitor unit 10. The fault interruptor of the present invention involves a protective system for a plastic encased metallized polypropylene film dry capacitor, using a fuse to protect against an in-rush of high current and a thermal protector to protect against a current which is low enough that it would not take out a fuse but nevertheless over time would cause a capacitor to heat up to a point at which a fire could occur or the plastic case would melt and therefore be ruptured. The invention may also be used with metallized film capacitors in metal housings.

The invention incorporates both a fuse and a thermal protector to cover the spectrum of possible failure modes. The fuse and the thermal protector are connected in series with the capacitor section. In addition, it is advantageous that the thermal protector be well placed in the capacitor unit 10 to increase its sensitivity to temperature changes. Referring to FIG. 1, the preferred embodiment of the protective circuit of the present invention consists of three additional principal components. One component is a fuse 30 to protect the capacitor 10 from over currents. The second component is a thermal protector 34 and the third component is a sheet of aluminum foil 38. The thermal protector 34 and the aluminum foil 38 cooperate together to protect the capacitor 10 from over temperature. These three additional components all cooperate to protect capacitor 10 from any failure due to an internal fault in capacitor section 16. If case 12 and cover 14 are metallic, the aluminum foil 38 may not be needed.

In the preferred embodiment, a fuse 30 is electrically connected by its lead 31 at one end to first contact point 18 and at its other end to first lead 22 within case 12. For the intended use as a high intensity discharge ballast capacitor, the fuse 30 is preferably Little Fuse or Buss 3AG/3AG3/3A-7A, or the like. A second lead 24 is spliced into sections 24a, 24b. One end of section 24a is electrically connected to second contact terminal 20, at the opposite end of capacitor section 16. A one shot thermal protector 34, such as a Microdisc 5000 series or 4000 series, 117° C., is electrically connected between the other end of section 24a and one end of section 24b of second lead 24. Lead 24 is then fed through hollow core 17 of capacitor section 16 such that thermal protector 34 is approximately centered between the ends of hollow core 17. Second lead section 24b continues through core 17 to the top and then exits case 12 at an appropriate point.

A thin sheet of aluminum foil 38 is wrapped around the circumferential perimeter of capacitor section 16. It is preferred that foil 38 be in contact with one shooped edge, but avoid electrical contact with the other shooped edge 18, or 20. Foil 38 is held in a tightly wrapped position by any suitable fastening means such as tape 39 or adhesive. The sheet of aluminum foil could be replaced by any other material which could contain the heat generated by a fault and prevent melted metallized film from spreading before the thermal protector 34 is actuated. Foil 38 may not be needed if case 12 and cover 14 are metallic or have a very high melting temperature.

The entire assembly of capacitor section 16, leads 22, 24, fuse 30, thermal protector 34 and aluminum foil 38 is placed in case 12. Potting material 40 is placed in case 12 to cover about three-fourths of the assembly. It is not necessary to put any potting material 40 in core 17 or completely fill the case 12. Leads 22, 24 are placed in lead slots (not shown) in case 12, and cover 14 is affixed to case 12 by any suitable means, such as ultrasonic welding.

The alternate embodiment of a protected capacitor 60 illustrated in FIG. 3, wherein like reference numbers refer to like parts, differs from the preferred embodiment in that case 62 and cover 64 are metallic. Since melting of a plastic case caused by a hot spot or over temperature in general is not a problem, the configuration of FIG. 3 does not require aluminum sheet 38 secured by tape 39 to contain melting metallized film of capacitor film roll 16, as in the embodiment of FIG. 1. However, both fuse 30 and thermal protector 34 serve to protect a capacitor in metal can 62 having a metal cover 64 from rupture caused by the expansion of gases.

The operation of protected capacitor 10 is as follows. When voltage and current are applied to a capacitor 10 which has an internal fault or is shorted, one of two events can occur. First, if the short is of low resistance, an increase in current will occur. For the first event, an over current or a sudden in-rush of current, the fuse 30 is used for protection. The fuse rating is determined by the capacitance, voltage and cycles/second. The operation of the fuse is well known.

Second, if the resistance is high, the current will be low enough to pass through the short and heat up the capacitor. The heat within the capacitor will also cause an increase in gaseous pressure within the sealed capacitor case 12, but there will be no increase in pressure without first having an increase in temperature.

For the second event, a slow rise in temperature, the invention uses a one shot thermal protector 34 and a sheet of aluminum 38. The aluminum is wrapped around the capacitor section 16 in contact with only one shooped edge, and serves to reflect the heat generated from a short back into the capacitor section 16, towards its core 17. With this concentration of reflected heat, the thermal protector 34 positioned within core 17 will open before damage to capacitor 10 can cause rupture of case 12.

The present invention incorporates both the fuse and the thermal protector in series with the capacitor section to cover the wide spectrum of possible failure modes which can occur in a high intensity discharge ballast capacitor. In either event, either the fuse or the thermal protector will be activated and, since they are connected in series, the circuit will be interrupted by the interruption of one lead thereof. Also in the present invention, since a fuse is used rather than a type of diaphragm which will interrupt a contact upon the exertion of pressure, the large surges of electric current which would normally produce gases within a faulted metallized film capacitor, will trigger the fuse before the gases accumulate to cause an rupture or other type of fracturing of case 12. No possible restrike can occur, and the capacitor will remain within its case because the interruption of the circuit will occur before any possible rupture of the case. Thus the current interruption will occur before either a hot spot, a melting of plastic or an excessive expansion of gases will occur. With this combination of a fuse and thermal protection, a complete protective system is utilized to cover all aspects of failure due to shorts.

Table 1 presents a partial listing of capacitor types rated by microfarads and the approximate amperage at which the fuse must blow to provide effective protection. Some of these capacitors may have discharge resistors.

TABLE 1

| Capacitor uf | Rated Voltage —V | Fuse Amps |
| --- | --- | --- |
| 6 | 280 | ¾ |
| 7 | 280 | ¾ |
| 8 | 280 | 1.5 |
| 10 | 280 | 1.5 |
| 17.5 | 280 | 3 |
| 20 | 280 | 3 |
| 22.5 | 280 | 3 |
| 24 | 280 | 4 |
| 28 | 280 | 4 |
| 35 | 280 | 4 |
| 35 | 280 | 7 |
| 48 | 280 | 7 |

The one-shot thermal protector will interrupt current when the internal temperature reaches about 117° C. The ratings of Table 1 and the thermal protector are effective to meet any presently known UL standards. The thermal protector in general should be rated somewhere between the maximum rated operating temperature of the capacitor and the maximum rating of the capacitor materials.

Figure 2:
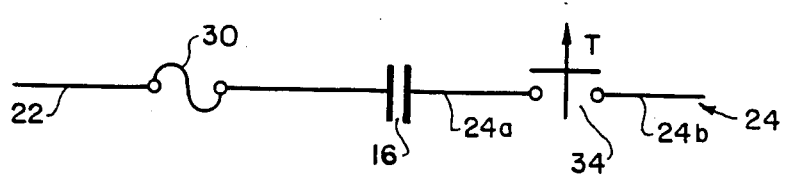
FIG. 2 is a schematic diagram of the protected capacitor of the present invention.

FIG. 2 is a schematic of the electrical circuit of the present invention. It should be noted that since the fuse 30, capacitor section 16 and thermal protector 34 are connected in series, the sequence of these components in the circuit construction may be changed without affecting its function.

The protective fault interruptor of the present invention differs significantly from and has many advantages over the prior art. Since the capacitor has a wide range of operating conditions, especially in terms of current flowing therethrough, this protective fault interruptor serves to protect the capacitor from a wide variety of possible failure modes. The combination of thermal and electrical protection as disclosed herein represents a significant advance in meeting safety requirements. The fault interruptor of the present invention uses only normal connections; no special connections are required. It is a very simple internal device. No major modifications to the case of the capacitor are required. The case does not require any special hermetic seal. And the device works with a fully encapsulated roll without requiring the case dimensions to change in order to interrupt a circuit.

What is claimed:

1. A capacitor having a protective fault interruptor system for its capacitor section, wherein said capacitor includes a metallized film capacitor section having a hollow core, shooped edges on said capacitor section serving as contact points for each plate of said capacitor, wherein said contact points are spaced apart from one another, said capacitor being connectable to a circuit through electrical leads from said contact points, a case, potting material securing said capacitor section and a portion of said leads within said case, and said leads extending through a wall of said case, wherein the protective fault interruptor system for said capacitor comprises:

a fuse electrically connected at one end to a first one of said contact points and connected at its other end to a first one of said electrical leads;

a second one of said leads being divided into two sections, a first section of said second lead being electrically connected to a second one of said contact points at one end of said lead;

a thermal protector connected to the second end of said first section of said second lead and to the first end of the second section of said second lead;

said second lead with said thermal protector being spliced therein passing through the hollow core of said capacitor such that said thermal protector is positioned centrally within said hollow core;

said capacitor section, said fuse, said thermal protector and portions of said leads being positioned within said case;

said potting material securing said capacitor section within said case by covering more than one-half of the volume between said circumferential perimeter of said capacitor section and the interior wall of said case;

said fuse, said capacitor section and said thermal protector thereby being connected in series to isolate said capacitor section from an electrical circuit when a short of low or high resistance develops within said capacitor section.

2. The capacitor of claim 1 wherein said case is plastic.

3. The capacitor of claims 1 or 2 further including:

a heat reflective sheet wrapped around the circumferential perimeter of said capacitor section such that said heat reflective film is in contact with one of said shooped edges and is electrically insulated from the second of said shooped edges of said capacitor section.

4. The capacitor of claim 3 wherein said heat reflective material is aluminum foil.

5. The capacitor of claim 1 wherein said case is metallic.

6. An AC capacitor having a protective fault interrupter system, comprising a metallized film capacitor section, a heat reflective film wrapped around said section; shooped edges serving as contact points for each plate of said capacitor, wherein said contact points are spaced apart from one another, said capacitor being connectable to a circuit through electrical leads from said contact points; a case having a cover; potting material securing said capacitor section and a portion of said leads within said case, and said leads extending through a wall of said case; a fuse; and a thermal protector connected in series with said capacitor section through at least one of said leads; and wherein said fuse, said thermal protector, said capacitor section and the connections to said at least one lead are all positioned within said case.

7. The capacitor of claim 6 wherein said case and cover are made of non-metallic material.

8. The capacitor of claim 6 wherein said case and cover are made of a metallic material.

9. The capacitor of claim 6 wherein:
said potting material is at least partially disposed around said capacitor section within said case, firmly sealing said capacitor section and at least a portion of said fault interrupter within said case.

10. A capacitor having a protective fault interrupter system for its capacitor section, comprises a metallized film capacitor section having a hollow core; a heat reflective sheet wrapped around said capacitor section, shooped edges on said capacitor section serving as contact points for each plate of said capacitor, wherein said contact points are spaced apart from one another, said capacitor being connectable to a circuit through electrical leads from said contact points; a case; potting material securing said capacitor section and a portion of said leads within said case, and said leads extending through a well of said case;
a fuse electrically connected at one end to a first one of said contact points and connected at its other end to a first one of said electrical leads;
a second one of said leads being divided into two sections, a first section of said second lead being electrically connected to a second one of said contact points at one end of said lead;
a thermal protector connected to the second end of said first section of said second lead and to the first end of the second section of said second lead;
said second lead with said thermal protector being spliced therein passing through the hollow core of said capacitor such that said thermal protector is positioned centrally within said hollow core;
said capacitor section, said fuse, said thermal protector and portions of said leads being positioned within said case;
said potting material securing said capacitor section within said case by covering more than one-half of the volume between said circumferential perimeter of said capacitor section and the interior wall of said case;
said fuse, said capacitor section and said thermal protector thereby being connected in series to isolate said capacitor section from an electrical circuit when a short of low or high resistance develops within said capacitor section.

11. The capacitor of claim 10 wherein said heat reflective film is in contact with one of said shooped edges and is electrically insulated from the second of said shooped edges of said capacitor section.

12. The capacitor of claim 11 wherein said heat reflective material is aluminum foil.

13. An AC capacitor having a protective fault interruptor system, wherein said capacitor includes: a metallized film capacitor section, shooped edges serving as contact points for each plate of said capacitor section, said contact points being spaced apart from one another, said capacitor being connectable to a circuit through electrical leads from said contact points; a case having a cover; potting material within said case at least partially disposed around said capacitor section and firmly securing said capacitor section and a portion of said leads within said case, said leads extending through a wall of said case; and wherein said protective fault interruptor system for said capacitor comprises:
a fuse;
a thermal protector connected in series with one of said contact points of said capacitor section and one of said leads extending through said case;
said fuse and said thermal protector being connected in series with said capacitor section and at least a second of said leads extending through said case; and
said fuse, said thermal protector, said capacitor section and the connections to said one lead and said second lead all being positioned within said case.

* * * * *